United States Patent Office 2,804,375
Patented Aug. 27, 1957

2,804,375

CYCLIC PROCESS FOR THE BENEFICIATION OF TITANIA ORES AND SLAGS

Jonas Kamlet, Easton, Conn., assignor to National Distillers and Chemical Corporation, New York, N. Y., a corporation of Virginia No Drawing. Application May 28, 1953, Serial No. 358,161

14 Claims. (Cl. 23—202)

This invention relates to a cyclic process for the beneficiation of titania ores and slags. More particularly it relates to a cyclic process for the recovery of high titania-content concentrates from ores and slags containing titanium dioxide in admixture with iron oxides. It has for its purpose to provide a cyclic process whereby titanium dioxide concentrates may be obtained largely freed of concomitant iron oxides in the original ores or slags. It has for its further purpose to obviate the expensive and often burdensome necessity of disposing of large quantities of acidic by-products, at present obtained in the recovery of titanium dioxide from ores and slags, by providing a cyclic process whereby titanium dioxide concentrates, low in iron oxide content, are recovered in conjunction with a readily disposable by-product of iron oxides, and little or no other by-product.

By far the most widely used process for the manufacture of titanium dioxide is that described by Washburn (U. S. Patent 1,889,027 (1933); British Patent 288,569 (1927); French Patent 652,357 (1928); Canadian Patent 299,992 (1930)). Ilmenite (or a high-titania iron oxide-containing slag) is ground, digested with concentrated sulfuric acid, diluted with water, treated with a reducing agent to convert ferric sulfate to the ferrous state, clarified by the addition of antimony sulfide and a proteinaceous material which carry down all suspended matter, cooled to separate the large quantity of ferrous sulfate formed and filtered to separate the filtrate of titanic sulfate. The solution of titanic sulfate is then heated, seeded with crystals of externally prepared anatase or rutile crystals, and converted to insoluble dehydrated metatitanic acid. This precipitate is filtered from the solution of sulfuric acid which retains the ferrous sulfate not crystallized out in the preceding step. The metatitanic acid is then washed with water, pulped, filtered and then calcined to obtain a pure titanium dioxide.

This process, now almost universally employed, involves the necessity of disposing of huge quantities annually of dilute sulfuric acid containing large amounts of ferrous sulfate (copperas). No economic use for this acidic by-product has yet been found although hundreds of potential uses for this waste have been proposed. It is a purpose of this invention to avoid the formation of this acidic by-product and to provide in its stead a process whereby ores and slags containing titanium dioxide and iron oxides may be separated into concentrates, one containing titanium dioxide with little or no iron oxide contaminant, the other containing the iron oxides and representing a readily salable by-product, with little or no other by-products being obtained.

The ores and slags suitable for use as raw materials in the process of the present invention are ilmenite, ilmenite-magnetite, ilmenite-hematite, titaniferous magnetite, titaniferous hematite, rutile, arizonite, titaniferous beach sands, residues from bauxite beneficiation by the Bayer alumina process (the so-called "red mud"), blast furnace slags and basic open-hearth furnace slags containing appreciable amounts of titania and the high-titania slag obtained by the smelting of ilmenite in the electric furnace in the presence of coke and a limestone or dolomite flux (such as the slag averaging 72% $TiO_2$ and 9% $FeO$ obtained in the Sorel, Quebec, operation of the Quebec Iron and Titanium Corporation).

The basis of my invention may best be understood by a description of each step thereof seriatim:

STEP I.—SELECTIVE LEACHING OF IRON OXIDES

The first step of this process involves the selective leaching of the iron oxide content of the comminuted ore or slag with aqueous hydrochloric acid. Farup, in U. S. Patent 1,325,561 (1919) first indicated that aqueous hydrochloric acid would selectively extract the iron oxides from titaniferous iron ores. Improvements of the Farup technic have subsequently been described by Llewellyn (British Patent 409,847 (1933)) and Pamfilov and Shthandel (Journ. Gen. Chem. USSR 6, 300 (1936)).

I have found that substantially complete separation of the titanium dioxide and the iron oxides content of ores and slags may be obtained.

(a) By grinding the ore or slag to a fineness corresponding to 100% passing a 20 mesh screen and preferably at least 70% passing a 60 mesh screen, (b) By extracting the ground ore or slag with 10% to 37% aqueous hydrochloric acid at a temperature between 60° C. and 110° C., with stirring, until a major portion of the iron oxides have been dissolved as ferrous chloride and ferric chloride, and (c) Filtering the acid solution of $FeCl_2$ and $FeCl_3$ from the insoluble residue containing substantially all of the titanium dioxide and minor amounts of iron oxides and silica.

A preferred (but by no means critical) method for effecting this extraction involves two successive treatments with hydrochloric acid. The filtrate from the first extraction is processed to recover values as will be described below. The insoluble residue from the first extraction (containing $TiO_2$, silica and some iron oxides) is then treated with fresh hydrochloric acid and submitted to a second extraction. The filtrate from the second extraction is used as the acid medium to effect the first extraction. The insoluble residue from the second extraction now contains $TiO_2$, silica and little or no iron oxides.

In other words, the flow of acid through the extraction step of this process is counter to the flow of the ground ore or slag. Freshly regenerated hydrochloric acid is first used to extract once-extracted raw material. The fresh acid dissolves substantially all of the iron oxides not dissolved in the first extraction. The filtrate of the second extraction is used as the acid in the first extraction. After removing the major portion of the iron oxides in the first extraction, the acid filtrate containing $FeCl_2$ and $FeCl_3$ is processed as described below, and the insoluble residue is submitted to a second extraction with fresh hydrochloric acid.

I have also found that the addition of small amounts of acid-compatible surface active agents to the hydrochloric acid, e. g. from 0.01% to 0.5%, materially facilitates and accelerates the extraction of the iron oxides from the comminuted ore. Typical examples of such acid-compatible surface active agents suitable for use in this invention are the alkyl sulfates, the alkyl aryl sulfonates, the sulfated fatty acid glycerides, the alkylnaphthalene sulfonates, the condensation products of fatty acids and dialkanolamines, the polyethyleneglycol ethers, esters and thio-ethers of fatty acids, fatty alcohols and alkylphenols, the alkylsulfonates and the quaternary ammonium derivatives.

The example given below and subsequent examples to be given in this application, are intended to define and to illustrate the present invention but in no way to limit it to reagents, proportions or conditions described therein. Obvious modifications will occur to any person skilled in the art. All parts given are parts by weight.

*Example I.—Selective leaching of iron oxides*

An ilmenite ore analyzing 44.2% $TiO_2$, 35.0% FeO and 16.0% $Fe_2O_3$ is ground to a fineness corresponding to 70% passing a 60 mesh screen. 1000 parts of the ground ore are added, with good stirring to 3000 parts of the acid filtrate from the previous second extraction. (In the first run, 3000 parts of 20% aqueous hydrochloric acid containing 0.05% of sodium kerylbenzene sulfonate are used instead.) The agitated reaction mixture is heated at 90° to 100° C. for six hours, and is then filtered. The filtercake is then added to 3000 parts of fresh 20% aqueous hydrochloric acid containing 0.05% of sodium kerylbenzene sulfonate and the mixture is heated and agitated at 90° to 100° C. for a further six hour period, and is then filtered. The filtrate from the second extraction is used as the acid medium to effect the first extraction of the next batch of comminuted ore. The filtrate from the first extraction, comprising a solution of $FeCl_2$, $FeCl_3$ and some free hydrochloric acid is processed as will be described below.

The filtercake from the second extraction is washed with water until the washings are neutral to litmus. The filtercake, on drying, will be found to contain 408 parts of $TiO_2$, 38 parts of $SiO_2$, 3 parts of FeO and 1.8 parts of $Fe_2O_3$. This represents a recovery of 92.3% of the $TiO_2$ and a separation of over 99% of the iron oxides in the original ore.

This filtercake may then be dried or calcined and represents an ideal raw material for the manufacture of titanium dioxide for pigment and metallurgical use, titanium dioxide for the manufacture of metallic titanium by calcium or calcium hydride reduction (Kroll, Zeit. anorg. allgem. Chemie 234, 42–50 (1937)), or for the manufacture of titanium tetrachloride for the Kroll titanium metal process (Kroll, Trans. Electrochem. Soc. 78, 35–47 (1940); Dean, Long, Wartman and Andersen, A. I. M. M. E. Techn. Pub. 2961 (1946)).

Thus, the filtercake may be converted to pure titanium dioxide by solution in concentrated sulfuric acid, according to the well-known technic of the Washburn process. However, since the filtercake contains little or no iron oxides, the dilute sulfuric acid from the titanic sulfate hydrolysis will contain little or no ferrous sulfate. It may therefore be recovered, concentrated and re-used almost indefinitely. Not only does this obviate the necessity of disposing of large quantities of a noisome by-product but it also represents a very considerable economy in reagent costs.

The dried or calcined filtercake is also ideally suited for the manufacture of titanium tetrachloride. The dried product is mixed with coal, coke or wood charcoal, briquetted with a binder such as tar or pitch and is then chlorinated at approximately 700° C. in a furnace or tube of suitable construction (Muskat and Taylor, U. S. Patent 2,184,887 (1939); McTaggart, Journ. Council Sci. Ind. Research 18, 5 (1945)). Because of the low iron oxide content of the dried filtercake, the problem of separating ferric chloride from the titanium tetrachloride is largely obviated and it may even be found feasible to dispense with the redistillation of the $TiCl_4$ from copper turnings to give a colorless product.

STEP II.—SEPARATION OF IRON OXIDES AND MAGNESIUM CHLORIDE

The filtrate from the first extraction in step I (comprising an aqueous solution of $FeCl_2$, $FeCl_3$ and some free HCl) is now treated, with agitation, with a stoichiometric quantity of at least one member of the group consisting of magnesium oxide, magnesium hydroxide and basic magnesium chloride. The reactions involved are:

$$FeCl_2+MgO+H_2O \rightarrow Fe(OH)_2+MgCl_2$$
$$FeCl_2+Mg(OH)_2 \rightarrow Fe(OH)_2+MgCl_2$$
$$FeCl_2+2Mg(OH)Cl \rightarrow Fe(OH)_2+2MgCl_2$$
$$2FeCl_3+3MgO+3H_2O \rightarrow 2Fe(OH)_3+3MgCl_2$$
$$2FeCl_3+3Mg(OH)_2 \rightarrow 2Fe(OH)_3+3MgCl_2$$
$$2FeCl_3+6Mg(OH)Cl \rightarrow 2Fe(OH)_3+6MgCl_2$$

The free hydrochloric acid is, of course, neutralized by the magnesium compound to form soluble magnesium chloride.

The magnesium compound may be added directly to the acid solution of iron chlorides. Alternately, the magnesium compound may be slurried with water and the slurry then added to the acid solution of iron chlorides. In the latter case, part of the MgO will be hydrated to $Mg(OH)_2$. The reaction may be effected at room temperature. However, I prefer to effect the reaction at temperatures between 50° C. and the boiling point of the reaction mixture.

The precipitated $Fe(OH)_2$ and $Fe(OH)_3$ are gelatinous and quite difficult to filter off. I have found that if the reaction mixture is treated with an oxygen-containing gas (such as air) for a sufficient period of time (usually 30 to 120 minutes) at a temperature of from 50° C. to the boiling point of the solution, the $Fe(OH)_2$ and $Fe(OH)_3$ are oxidized to a dense, compact mixture of ferrosoferric oxide; ($Fe_3O_4$) and ferric oxide ($Fe_2O_3$), which may be in a partially hydrated form. The reaction of the liquor with the neutralizing magnesium compound and the aeration may be effected consecutively or simultaneously. This step of the process may be operated either batchwise or on a continuous basis. In operating this step on a continuous basis, it is preferred to effect the neutralization of the acid liquor with the magnesium compound, and the oxidation (aeration) in separate vessels or reaction chambers. The pH of the neutralized reaction medium is not too critical in this step since the oxidation of the gelatinous iron hydroxides to the compact, easily filterable iron oxides seems to proceed satisfactorily at all pH's from 2.0 to 12.0.

At the conclusion of the aeration (oxidation), the iron oxides are separated (by filtration, decantation, centrifuging or other means) from the filtrate of magnesium chloride.

The oxidation may be effected with pure oxygen or an oxygen-containing gas. However, since air seems to be eminently satisfactory for this step, no economic advantage is seen in the use of oxygen.

*Example II.—Separation of the iron oxides and magnesium chloride*

The filtrate and washings from the first step comprising 3200 parts of a solution containing 980 parts of $FeCl_2.4H_2O$, 267 parts of $FeCl_3.6H_2O$ and 127 parts of HCl, obtained warm (70°–80° C.) from the filterpress, are treated in portions with a total of 332.5 parts of magnesium oxide or equivalent while passing a vigorous current of air through the reaction mixture at the rate of 500 liters per hour per liter of solution. After all of the magnesium oxide has been added, aeration is continued, at 70°–90° C., until the gelatinous iron hydroxides are completely converted to insoluble ferrosoferric and ferric oxides. The reaction mixture is then filtered hot.

The insoluble residue of iron oxides represents a valuable by-product and may be disposed of as dictated by local market and raw material conditions.

The filtrate and washings will comprise about 3300 parts of solution containing 786.2 parts of magnesium chloride (anhydrous basis). This is processed further as will be described below.

*Step III.—Regeneration of magnesium oxide and hydrochloric acid*

It is well known that aqueous solutions of magnesium chloride may be evaporated and concentrated (e. g. in triple-effect evaporators) to solutions containing 46.8%

MgCl₂, which crystallize to the hexahydrate, MgCl₂.6H₂O, on cooling. This hexahydrate may be dehydrated to the dehydrate, MgCl₂.2H₂O, without difficulty (Ind. Eng. Chem. News 19, 1193 (1941); U. S. Patents 1,389,546 and 1,557,600; German Patents 51,084 and 383,536). Even at comparatively low temperatures (e. g. 110°), these MgCl₂ hydrates will commence to hydrolyze. According to Frank (German Patent 422,322) MgCl₂.2H₂O fed to a rotary kiln maintained at 500°–600° C., will be almost quantitatively hydrolyzed to magnesium oxide, probably admixed with some magnesium hydroxide and basic magnesium chloride:

$$MgCl_2.2H_2O \rightarrow MgO + 2HCl + H_2O$$
$$MgCl_2.2H_2O \rightarrow Mg(OH)Cl + HCl + H_2O$$
$$MgCl_2.2H_2O \rightarrow Mg(OH)_2 + 2HCl$$

Magnesium chloride hexahydrate and anhydrous magnesium chloride in the presence of a current of steam will be hydrolyzed in a similar manner (Eschellmann, Chemische Industrie 12, 2 (1889)); Lunge, Handbuch der Sodaindustrie (Braunschweig, 1909), vol. III, pp. 447–467); Barth, Zeit. angew. Chem. 301, 55 (1917); Lepsius, Zeit. angew. Chem. 311, 93 (1918); Weldon, Journ. Soc. Chem. Ind. 4, 175 (1885); Kingzett, Journ. Soc. Chem. Ind. 7, 286 (1886).

The construction of muffle ovens, reverberatory furnaces and rotary kilns for effecting this hydrolysis is described in the Salzbergwerke Neustassfurt German Patents 36673, 47043, 48552 and 54830 and in Hepke's German Patent 278,106. Beck (German Patent 304,342) describes the addition of 2% to 5% of MgSO₄ to the MgCl₂ to avoid fusion of the melt during hydrolysis.

If air or an oxygen-containing gas is also passed over the magnesium chloride during the hydrolysis process, a considerable portion of the hydrogen chloride formed is oxidized to chlorine. This is the basis of the Weldon-Pechiney process for the manufacture of chlorine (Dewar, Journ. Soc. Chem. Ind. 6, 785 (1886); Boulouward, German Patents 30,841 and 45,724; Lunge-cited supra). The chlorine admixed with hydrogen chloride and excess air is scrubbed with water to separate the chlorine stream (usually 6%–10% in concentration) from the hydrochloric acid. It is specifically understood that the Weldon-Pechiney process may be operated in conjunction with the third step of this new process, providing that at least a portion of the magnesium chloride is hydrolyzed to hydrogen chloride.

I prefer to effect the third step of my new process by concentrating the magnesium chloride solutions obtained in the second step to the hexahydrate stage, thereafter further dehydrating it by the processes well known in the art to the MgCl₂.2H₂O stage. The latter is then fed continuously to a gas-fired rotary kiln maintained at a temperature of 500°–600° C., for a residence period of 20 to 30 minutes. The MgCl₂.2H₂O is hydrolyzed to a mixture assaying about 92.5% MgO, 5.2% Mg(OH)Cl and 2.0% Mg(OH)₂. The recovery of basic magnesium-compounds is 92–95% of the magnesium fed (by theory).

The kiln gases are passed through a waste heat boiler and are then scrubbed through a hydrochloric acid absorption tower. There is thus recovered from 80% to 90% of the hydrochloric acid used in the first step of the process. Of course, if air is fed through the kiln in quantiites sufficient to maintain an axidizing atmosphere, the kiln gases will contain a mixture of chlorine and HCl, which may be separated and recovered according to the Weldon-Pechiney process technic. The aggregate yield of chlorine plus HCl recoverable by this modification also varies from 80% to 90% of the theoretical, based on the hydrochloric acid used in the first step of the process.

When the process of the present invention is employed in conjunction with the manufacture of titanium tetrachloride for the Kroll titanium metal process, the magnesium chloride obtained in the third step of this process may also be further dehydrated to the hemi- or mono-hydrate, or to anhydrous MgCl₂ (Gann, Ind. Eng. Chem. 22, 694 (1930)), and employed to provide the "make-up" required for the electrolytic cells producing the chlorine for the manufacture of TiCl₄ and the metallic magnesium for the reduction of the TiCl₄. This provides a great measure of flexibility for the process since a portion of the MgCl₂ may always be diverted to provide this "make-up" and the remainder may always be recycled to the process by hydrolysis to MgO and HCl.

*Example III.—Regeneration of the magnesium oxide and hydrochloric acid*

The filtrate and washings from the second step of the process comprising 3300 parts of a 23.8% MgCl₂ solution are evaporated and dehydrated to a dry residue of 1070 parts of magnesium chloride dihydrate. This is fed to a short, gas-fired rotary kiln maintained at a temperature of 500°–600° C. for a residence period of 20 to 30 minutes. The kiln gases are cooled through a waste heat boiler and are then scrubbed through a Knight tower to regenerate the hydrochloric acid. The acid formed is diluted to 20% HCl (density 1.097), which is returned to the first step of the process. There is thus recovered 2535 parts of 20% HCl solution, or 84.5% of the hydrochloric acid used in the first step of the process.

The magnesia compounds recovered from the kiln contain 283.3 parts of magnesium oxide, 27.6 parts of basic magnesium chloride and 8.8 parts of magnesium hydroxide, being equivalent in neutralizing capacity to 307.6 parts of MgO, or a recovery of 92.5% of the magnesium oxide originally used in the second step of the process. The magnesia compounds are returned to the process for neutralization of a subsequent batch of acid filtrate in step II of the process.

A raw materials balance for this process may be given as follows:

1000 parts of ilmenite ore (44.2% TiO₂, 35.0% FeO, 16.0% Fe₂O₃)
125 parts of 22° Bé. hydrochloric acid (make-up)
60 parts of magnesium chloride (anhydrous equivalent) (make-up)
1.5 parts of codium kerylbenzene sulfonate Will yield 408 parts of titanium dioxide as a concentrate containing 90.5% TiO₂, 8.4% SiO₂ and 1.1% iron oxides
488 parts of iron oxides (Fe₂O₃ to Fe₃O₄ in composition) (70.4% Fe assay dried)

Fuel required for the process (oil, gas, powdered coal) amounts to the equivalent of about 1200 pounds of coke per ton of ilmenite processed.

Having described my invention, what I claim and desire to protect by Letters Patent is:

1. A cyclic process for the beneficiation of titania slags and ores which comprises the steps of: (a) treating the comminuted raw material with hydrochloric acid at a temperature between 60° C. and 110° C. and separating the filtrate of iron chlorides from the insoluble residue of iron oxide-poor titanium dioxide concentrate, (b) reacting the acid filtrate of iron chlorides obtained in step (a) with a stoichiometric amount of at least one member of the group consisting of magnesium oxide, magnesium hydroxide and basic magnesium chloride, and separating the iron hydroxides from the solution of magnesium chloride thus obtained, and (c) concentrating the magnesium chloride solution obtained in step (b) and submitting said magnesium chloride to hydrolysis at temperatures between 110° C. and 600° C. whereby there are regnerated the hydrochloric acid employed in step (a) and the basic magnesium compound employed in step (b).

2. The process of claim 1 applied to the beneficiation of ilmenite.

3. The process of claim 1 applied to the beneficiation of titaniferous hematite.

4. The process of claim 1 applied to the beneficiation of titaniferous magnetite.

5. The process of claim 1 applied to the beneficiation of the high titania slag obtained in the electric furnace smelting of iron oxide-titanium dioxide ores in the presence of a carbonaceous reducing agent and a basic flux.

6. The process of claim 1 applied to raw materials comminuted to a fineness corresponding to 70% passing a 60 mesh screen.

7. The process of claim 1 wherein the comminuted ore is treated with hydrochloric acid containing 0.01% to 0.5% of a member of the group consisting of the nonionic and cationic surface-active agents.

8. The process of claim 1 wherein an acid solution containing iron chlorides is treated with at least one member of the group consisting of magnesium oxide, magnesium hydroxide and basic magnesium chloride, and the resultant solution of magnesium chloride is separated from the precipitate of iron hydroxides.

9. The process of claim 1 wherein an acid solution containing iron chlorides is treated at a temperature between 50° C. and the boiling point of the reaction mixture with at least one member of the group consisting of magnesium oxide, magnesium hydroxide and basic magnesium chloride, while passing an oxygen-containing gas through the reaction mixture, and thereafter separating the resultant solution of magnesium chloride from the insoluble precipitate of iron oxides.

10. The process of claim 9 where the oxygen-containing gas employed is air.

11. The process of claim 1 wherein a hydrated magnesium chloride is hydrolyzed at a temperature in excess of 110° C. to obtain hydrochloric acid and at least one member of the group consisting of magnesium oxide, magnesium hydroxide and basic magnesium chloride.

12. The process of claim 1 wherein a hydrated magnesium chloride is hydrolyzed at a temperature between 500° and 600° C. to obtain hydrochloric acid and at least one member of the group consisting of magnesium oxide, magnesium hydroxide and basic magnesium chloride.

13. The process of claim 1 wherein anhydrous magnesium chloride is hydrolyzed in the presence of steam at a temperature between 500° and 600° C. to obtain hydrochloric acid and at least one member of the group consisting of magnesium oxide, magnesium hydroxide and basic magnesium chloride.

14. The process of claim 1 wherein the hydrolysis of the magnesium chloride is effected in the presence of an oxygen-containing gas to yield a mixture of chlorine and hydrochloric acid and at least one member of the group consisting of magnesium oxide, magnesium hydroxide and basic magnesium chloride.

References Cited in the file of this patent

UNITED STATES PATENTS

| | | |
|---|---|---|
| 2,088,913 | Llewellyn | Aug. 3, 1937 |
| 2,155,119 | Ebner | Apr. 18, 1939 |
| 2,592,580 | Loevenstein | Apr. 15, 1952 |

FOREIGN PATENTS

| | | |
|---|---|---|
| 13,726 of 1889 | Great Britain | July 12, 1890 |
| 290,568 | Great Britain | May 23, 1929 |